(12) United States Patent
Weatherhead et al.

(10) Patent No.: US 7,894,917 B2
(45) Date of Patent: Feb. 22, 2011

(54) AUTOMATIC FAULT TUNING

(75) Inventors: Andrew N. Weatherhead, Ayr (CA);
Mark K. Carmount, Ayr (CA)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 329 days.

(21) Appl. No.: 11/855,646

(22) Filed: Sep. 14, 2007

(65) Prior Publication Data
US 2008/0097628 A1   Apr. 24, 2008

Related U.S. Application Data

(60) Provisional application No. 60/862,403, filed on Oct. 20, 2006, provisional application No. 60/890,973, filed on Feb. 21, 2007.

(51) Int. Cl.
*G05B 11/01* (2006.01)
*G06F 19/00* (2006.01)
(52) U.S. Cl. .............................. 700/14; 700/79; 700/80
(58) Field of Classification Search .................. 700/14, 700/79, 80
See application file for complete search history.

(56) References Cited

U.S. PATENT DOCUMENTS

| | | | |
|---|---|---|---|
| 3,928,772 A * | 12/1975 | Mooney | 307/116 |
| 4,118,635 A * | 10/1978 | Barrett et al. | 290/40 R |
| 4,215,396 A | 7/1980 | Henry et al. | |
| 4,519,027 A | 5/1985 | Vogelsberg | |
| 4,570,217 A | 2/1986 | Allen et al. | |
| 4,602,324 A * | 7/1986 | Fujawa et al. | 700/1 |
| 4,910,691 A | 3/1990 | Skeirik | |
| 4,990,057 A * | 2/1991 | Rollins | 417/12 |
| 5,058,043 A | 10/1991 | Skeirik | |
| 5,068,778 A | 11/1991 | Kosem et al. | |
| 5,214,577 A | 5/1993 | Sztipanovits et al. | |
| 5,255,197 A | 10/1993 | Iida | |
| 5,262,954 A | 11/1993 | Fujino et al. | |
| 5,388,318 A | 2/1995 | Petta | |
| 5,420,977 A | 5/1995 | Sztipanovits et al. | |
| 5,450,346 A | 9/1995 | Krummen et al. | |
| 5,555,179 A | 9/1996 | Koyama et al. | |
| 5,673,194 A | 9/1997 | Cipelletti et al. | |
| 5,751,582 A | 5/1998 | Saxena et al. | |

(Continued)

FOREIGN PATENT DOCUMENTS

EP   1770464   4/2007

OTHER PUBLICATIONS

OA mailed May 5, 2009 for U.S. Appl. No. 11/864,664, 21 pages.

(Continued)

*Primary Examiner*—Michael D Masinick
(74) *Attorney, Agent, or Firm*—Turocy & Watson LLP; William R. Walbrun; John M. Miller

(57) ABSTRACT

System(s) and procedure(s) facilitate monitoring of devices and automatic adjustment of fault timing parameters. A fault tuning component is embedded within a control module involved in a batch operation. The component executes a configurable tuning method that allows one or more devices to automatically tune fault timers. The fault tuning component can probe a number of events/operations to create a rolling average of device response, where the operational response for normal operation can be automatically adjusted as a result.

25 Claims, 12 Drawing Sheets

U.S. PATENT DOCUMENTS

| | | | |
|---|---|---|---|
| 5,880,954 A * | 3/1999 | Thomson et al. | 700/79 |
| 5,920,717 A | 7/1999 | Noda | |
| 5,946,212 A | 8/1999 | Bermon et al. | |
| 6,008,985 A | 12/1999 | Lake et al. | |
| 6,289,252 B1 | 9/2001 | Wilson et al. | |
| 6,397,114 B1 | 5/2002 | Eryurek et al. | |
| 6,449,624 B1 | 9/2002 | Hammack et al. | |
| 6,459,944 B1 | 10/2002 | Maturana et al. | |
| 6,501,995 B1 | 12/2002 | Kinney et al. | |
| 6,527,018 B2 | 3/2003 | Yamauchi et al. | |
| 6,535,769 B1 * | 3/2003 | Konar | 700/14 |
| 6,563,891 B1 * | 5/2003 | Eriksson et al. | 375/345 |
| 6,615,091 B1 * | 9/2003 | Birchenough et al. | 700/96 |
| 6,662,061 B1 | 12/2003 | Brown | |
| 6,675,324 B2 | 1/2004 | Marisetty et al. | |
| 6,708,104 B2 * | 3/2004 | Avery et al. | 701/110 |
| 6,760,630 B2 | 7/2004 | Turnaus et al. | |
| 6,832,118 B1 | 12/2004 | Heberlein et al. | |
| 6,853,920 B2 * | 2/2005 | Hsiung et al. | 702/1 |
| 6,859,755 B2 | 2/2005 | Eryurek et al. | |
| 6,865,432 B2 | 3/2005 | Brown | |
| 6,996,741 B1 | 2/2006 | Pittelkow et al. | |
| 7,058,712 B1 | 6/2006 | Vasko et al. | |
| 7,089,155 B2 | 8/2006 | Hegel | |
| 7,089,530 B1 | 8/2006 | Dardinski et al. | |
| 7,117,504 B2 | 10/2006 | Smith et al. | |
| 7,123,978 B2 | 10/2006 | Hartman et al. | |
| 7,149,595 B2 | 12/2006 | D'Mura | |
| 7,162,534 B2 | 1/2007 | Schleiss et al. | |
| 7,171,281 B2 * | 1/2007 | Weber et al. | 700/96 |
| 7,249,356 B1 | 7/2007 | Wilson et al. | |
| 7,254,457 B1 | 8/2007 | Chen et al. | |
| 7,289,861 B2 | 10/2007 | Aneweer et al. | |
| 7,307,986 B2 | 12/2007 | Henderson et al. | |
| 7,313,453 B2 | 12/2007 | Kline | |
| 7,333,024 B2 * | 2/2008 | Nickolaou et al. | 340/679 |
| 7,415,708 B2 | 8/2008 | Knauerhase et al. | |
| 7,424,331 B2 | 9/2008 | Patel | |
| 7,725,200 B2 | 5/2010 | Reed et al. | |
| 2001/0049562 A1 | 12/2001 | Takano et al. | |
| 2002/0010908 A1 | 1/2002 | Cheng et al. | |
| 2002/0042896 A1 | 4/2002 | Johnson et al. | |
| 2002/0059467 A1 | 5/2002 | Rapp et al. | |
| 2002/0100014 A1 | 7/2002 | Iborra et al. | |
| 2003/0051071 A1 | 3/2003 | Stefansson et al. | |
| 2003/0149756 A1 | 8/2003 | Grieve et al. | |
| 2003/0177018 A1 | 9/2003 | Hughes | |
| 2003/0220709 A1 | 11/2003 | Hartman et al. | |
| 2004/0095833 A1 | 5/2004 | Marisetty et al. | |
| 2004/0158713 A1 | 8/2004 | Aneweer et al. | |
| 2004/0172612 A1 | 9/2004 | Kasravi et al. | |
| 2004/0181294 A1 | 9/2004 | Deitz et al. | |
| 2004/0243260 A1 | 12/2004 | Law et al. | |
| 2004/0267515 A1 | 12/2004 | McDaniel et al. | |
| 2005/0004781 A1 * | 1/2005 | Price et al. | 702/188 |
| 2005/0015769 A1 | 1/2005 | Gegner | |
| 2005/0028133 A1 | 2/2005 | Ananth et al. | |
| 2005/0125512 A1 | 6/2005 | Fuller et al. | |
| 2005/0227217 A1 | 10/2005 | Wilson | |
| 2006/0026193 A1 | 2/2006 | Hood | |
| 2006/0085084 A1 * | 4/2006 | Nickolaou et al. | 700/12 |
| 2006/0101433 A1 | 5/2006 | Opem et al. | |
| 2006/0230383 A1 | 10/2006 | Moulckers et al. | |
| 2006/0259157 A1 | 11/2006 | Thurner | |
| 2006/0265688 A1 | 11/2006 | Carlson et al. | |
| 2006/0265695 A1 | 11/2006 | Arai | |
| 2007/0061125 A1 | 3/2007 | Bhatt et al. | |
| 2007/0089100 A1 | 4/2007 | Morris et al. | |
| 2007/0100486 A1 | 5/2007 | Burda et al. | |
| 2007/0101193 A1 | 5/2007 | Johnson et al. | |
| 2007/0162268 A1 | 7/2007 | Kota et al. | |
| 2007/0186090 A1 | 8/2007 | Yu et al. | |
| 2007/0220483 A1 | 9/2007 | Motoyama et al. | |
| 2007/0234283 A1 | 10/2007 | Baluja et al. | |
| 2007/0261027 A1 | 11/2007 | Dhanakshirur et al. | |
| 2007/0269297 A1 | 11/2007 | Meulen et al. | |
| 2008/0082186 A1 | 4/2008 | Hood et al. | |
| 2008/0120129 A1 | 5/2008 | Seubert et al. | |
| 2008/0126407 A1 | 5/2008 | Shimaoka et al. | |
| 2008/0188960 A1 | 8/2008 | Nixon et al. | |

OTHER PUBLICATIONS

OA mailed May 13, 2009 for U.S. Appl. No. 11/864,733, 23 pages.
OA mailed May 12, 2009 for U.S. Appl. No. 11/856,563, 30 pages.
OA mailed May 6, 2009 for U.S. Appl. No. 11/864,678, 22 pages.
OA mailed Oct. 29, 2009 for U.S. Appl. No. 11/856,563, 55 pages.
OA dated Mar. 10, 2010 for U.S. Appl. No. 11/861,562, 24 pages.
ANSI/ISA-88.01-1995. Batch Control, Part 1: Models and Terminology.
Maffezzoni, et al. Object-oriented models for advanced automation engineering. www.elsevier.com/locate/conengprac.
Office Action dated Sep. 16, 2010 for U.S. Appl. No. 11/774,824, 32 pages.

* cited by examiner

AUTOMATIC FAULT TUNING

CROSS REFERENCE TO RELATED APPLICATION

This application claims the benefit of U.S. Provisional Patent Application No. 60/862,403 entitled MODULE CONTROL AND STATE PROPAGATION, and filed on Oct. 20, 2006, the entirety of which is incorporated herein by reference. This application also claims the benefit of U.S. Provisional Patent Application No. 60/890,973 entitled MODULE CONTROL AND STATE PROPAGATION, and filed on Feb. 21, 2007, the entirety of which is incorporated herein by reference.

TECHNICAL FIELD

The claimed subject matter relates generally to industrial control systems and more particularly to a procedure to monitor and control components in an automated industrial operation.

BACKGROUND

One type of industrial control process is referred to as a batch process, which involves subjecting raw materials to processing steps using one or more pieces of equipment to produce a "batch" of product. Efforts to automate batch processing have led to the formation of standards committees by members of industries involved in batch processing and suppliers of batch processing equipment, among others. The general purpose of these standards committees has been to define uniform standards for automated batch processing. One such standard has been promulgated by the International Society for Measurement and Control, an international organization concerned with issues of process control. This standard is entitled Batch Control Part 1: Models and Terminology and is often referred to as the ISA S88.01-1995 standard (or "S88" for purposes of this application).

The S88.01 standard defines models of equipment and procedures for use in automated batch processes, as well as terminology for use in referring to those models and their elements. The S88.01 standard defines a "batch process" as a process that leads to the production of finite quantities of material by subjecting quantities of input materials to an ordered set of processing activities over a finite period of time using one or more pieces of equipment. A "batch" is defined as the material that is being produced or has been produced by a single execution of a batch process.

Batch-processing equipment (i.e., controllable elements such as valves, heaters, mixers, and so forth) is operated according to procedures to produce a batch. Generally, such equipment is referred to synonymously as equipment, equipment modules, processing equipment, or physical elements. The procedures to operate such physical elements are often referred to by the S88.01 standard as the "procedural model." According to the S88.01 standard, the procedural model is structured as a hierarchical ranking of procedures, with the highest level encompassing each of the lower levels, the next highest level encompassing each of the levels below it, and so on. Typically, the levels of the S88.01 procedural model of a particular application are, in descending order: the "procedure;" the "unit procedure;" the "operation;" and the "phase."

The term "procedural element" generally refers to components that employ any of the levels of the S88.01 procedural model, not just to those of the "procedure" level or any other single level of the procedural model. The highest-level procedural element of interest is referred to as a procedure, which is made up of one or more unit procedures. Each unit procedure is in turn made up of one or more operations, which are each in turn made up of one or more phases. The S88.01 procedural model does not preclude definition and use of other hierarchical levels, nor does it require that each level be present in particular applications. Rather, the standard is intended to provide a broad, standardized model for describing the procedures followed in automated batch-process control.

In a batch operation each device involved in production needs to be monitored, typically relying on timed events/operations since the state of a device is not always deterministic. Control systems adjust or tune timers that facilitate fault detection, the adjustment performed on a device by device basis for optimum operation performance. For example, a valve that is commanded to open/close as part of dispensing a fluid, such as milk, warm/cold water, or oil, in a recipe can have an associated timer adjusted (e.g., a time interval determined and associated with opening/closing the valve) to allow enough time for the commanded operation. Large batch processing operations can involve thousands of devices, thus adjusting and monitoring each of those devices can become an error-prone and costly operation, consuming significant personnel resources, time and funds.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

System(s) and procedure(s) facilitate automatic monitoring of components in a batch processing operation such as valves or other devices to determine the amount of time it takes to proceed to a commanded operation. From the monitoring, automatic adjustment of timing parameters can take place. Furthermore, as devices change characteristics overtime (e.g., a worn valve taking longer to open), the procedure(s) described herein can dynamically adjust timing parameters as detected conditions change. Automated fault tuning can be provided as an embedded system or component within each Control Module (a type of module used to control devices) involved in the batch operation. The component runs a configurable tuning algorithm which allows each device to automatically tune fault timers or other components. Procedure(s) or algorithm(s) can be configured for a number of operations to create a rolling average of device response for example, where the operational response for normal operation then has a configurable factor applied for fault monitoring logic.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Figure 1:
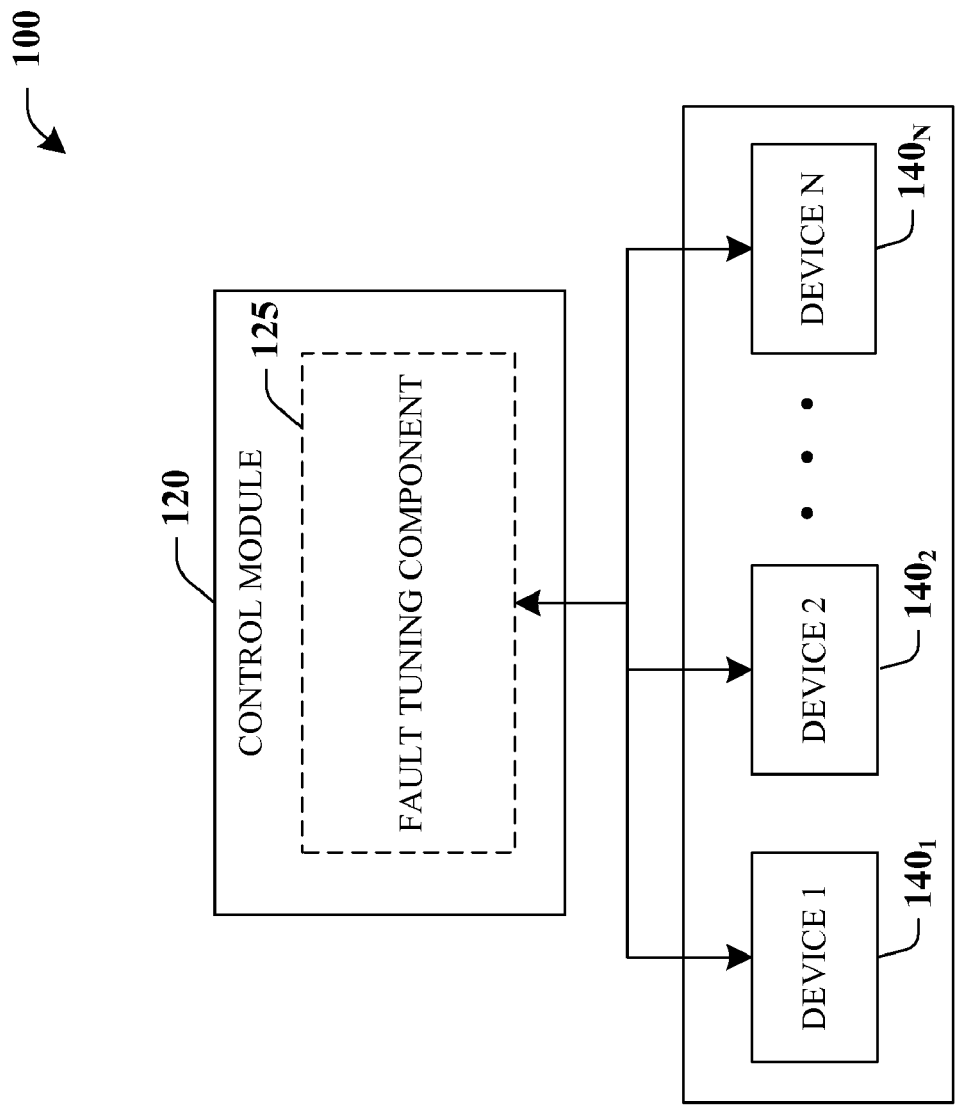
FIG. 1 is a high-level block diagram of a system that facilitates automatic fault tuning in an industrial process.

The present invention is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

It is noted that as used in this application, terms such as "component," "module," "model," and the like are intended to refer to a computer-related entity, either hardware, a combination of hardware and software, software, or software in execution as applied to an automation system for industrial control. For example, a component may be, but is not limited to being, a process running on a processor, a processor, an object, an executable, a thread of execution, a program and a computer. By way of illustration, both an application running on a server and the server can be components. One or more components may reside within a process and/or thread of execution and a component may be localized on one computer and/or distributed between two or more computers, industrial controllers, and/or modules communicating therewith.

System(s) and procedure(s) for monitoring of devices and automatic adjustment of fault timing parameters are described. A fault tuning component executes a configurable tuning method that allows one or more devices to automatically tune fault timers. The fault tuning component can probe a number of events/operations to assess device time response, whence the operational response for normal operation can be automatically adjusted as a result. Such aspects are disclosed in greater detail below.

FIG. 1 illustrates a high level block diagram of a system 100 that facilitates automatic fault timing of one or more devices $140_1$-$140_N$. In system 100, a fault tuning component 125 is embedded in a control module 120. The fault tuning component 125 probes one or more devices $140_1$-$140_N$, to determine the time response of the device, and effects adjustments to fault timers associated with the device. Fault timers can establish a timeframe for normal operation of a device (e.g., device $140_J$), and thus serve as a control entity that handles fault instances. Each device can have an array of fault timers, depending on the functionality of the device. In an aspect, a valve can have two fault timers corresponding to open/close timing. In another aspect, a mixing-tank feeder can have multiple fault timers associated to the disparate sources that can feed a mixing tank.

The devices $140_1$-$140_N$ can be part of a process (batch, continuous or discrete), and their operation can be interconnected as part of a procedure. It should be appreciated that in complex procedures, N can be of the order of $10^3$-$10^4$ devices and each of these devices needs to be fault tuned to establish normal operation. It should be appreciated that large operations can have multiple connectivity and redundancy (e.g., more than a critical device in a critical stage of a procedure) to mitigate fault propagation and maintain plant operability. Design of procedures can comprise reliability analysis and fault tolerance with respect to specific groups of devices. In an aspect, an intelligent module can conduct that type of analysis or similar (see below). Exemplary devices can be vessels, mixing tanks, valves, conveyor belts, ovens, coating chambers, limit switches, gas regulators, etc.

In addition, devices $140_1$-$140_N$ can be part of a safety system, and their operation can be interconnected as part of a safety system. Complex systems can have N of the order of $10^2$-$10^3$ devices. The devices when connected to a safety controller must maintain a certain safety rating (e.g., safety integrity level (SIL) standards or public law (PL) safety standards). Moreover, as devices are added to the system, the safety rating must be maintained. It should be appreciated that large operations can have multiple connectivity and redundancy to maintain the safety integrity of a system. In an aspect, an intelligent module (e.g., intelligent module 420) can conduct such a type of analysis or similar (see below).

As described above, the fault tuning component 125 is embedded in a control module 120. Such module is discussed in the following. Control module 120 can comprise physical components and logical components, such as instructions to a programmable logic controller. Tasks performed by a control module can comprise (i) conveying commands to a device (e.g., $140_J$, $1 \leq J \leq N$); (ii) driving a device to a state, which herein can be a S88 state, e.g., opened, closed, stopped; and (iii) providing control information on a device such as fault and warnings and current state. In an aspect of this application, software running a control module relies on control module classes, which afford the control module its control characteristics and render the control module reusable in different industrial settings. Exemplary modules are discussed below (in connection with FIG. 9).

Each control module has functionalities/objects that can be common to promote reusability. Exemplary such functionalities/objects are the following. (a) Data structure: This structure contains information issued to and created from the control module. Commands can be grouped in a common section, status can be given in a separate section, and the physical input/output (I/O) mappings can be grouped together as well. A data structure relevant to the subject application is the timer array register, which contains timing data. (b) Commands. Such are provided to allow control of certain device functions. These functions include enabling/disabling alarms and saving/restoring configuration. Additionally, commands can be provided to allow automatic (Auto) and manual control mode for a device. In an aspect, a control module can provide a set of open/close commands. Auto commands are only issued by programmable logic controller (PLC), and manual commands are only issued from the HMI (Human-Machine Interface). (c) Faults and Warnings. Faults can disable a control module's output and typically stop a process and require operator intervention to restart. Each alarm can be latched and enunciated on the HMI until the condition is removed and the operator has acknowledged the alarm condition. Warnings annunciate minor problems. Warnings do not require an acknowledgement; a warning and can be automatically cleared within the PLC when the warning condition ceases to be true. Module attributes are discussed below (in connection with FIG. 8).

Figure 2:
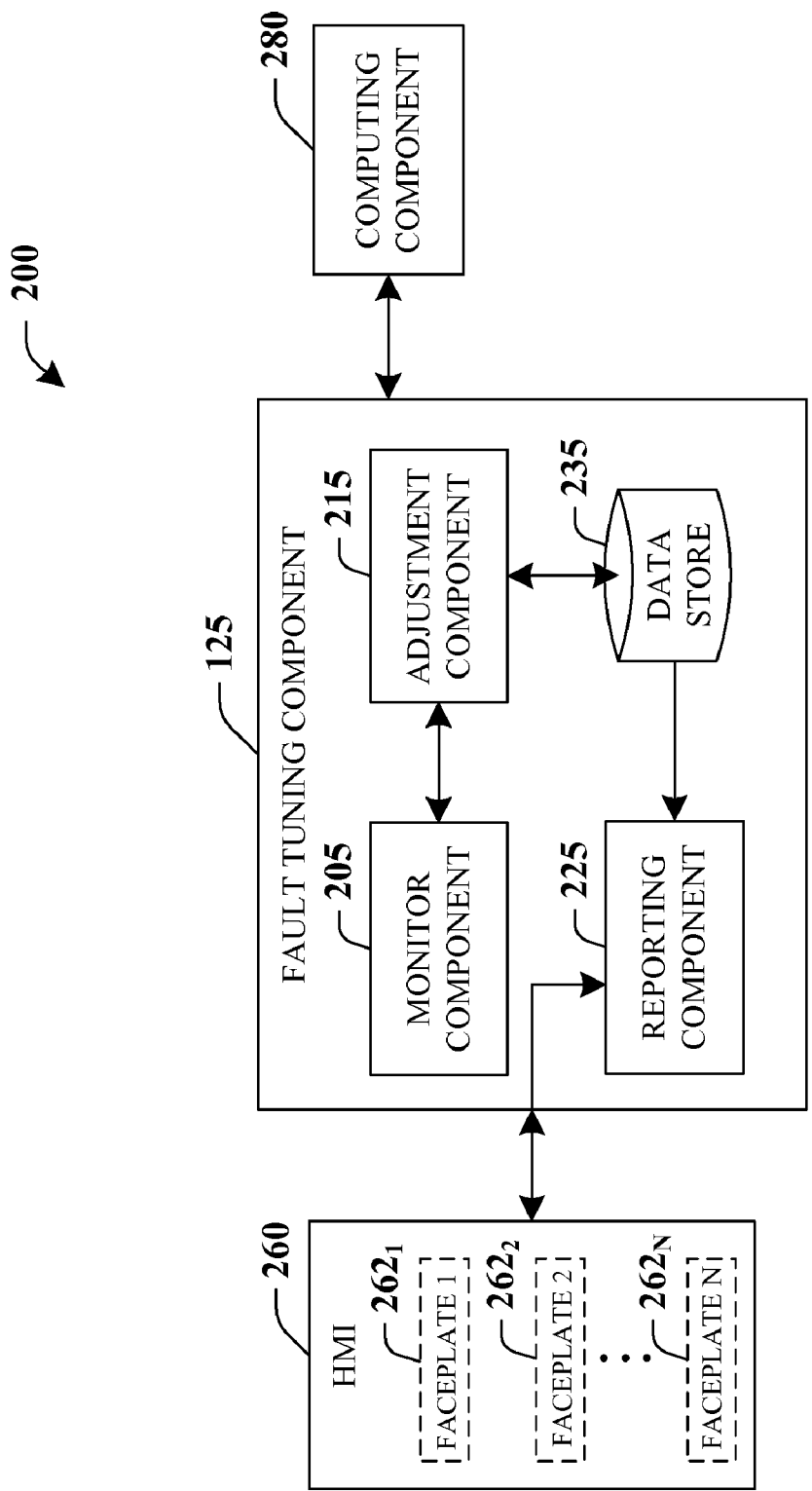
FIG. 2 is a granular block diagram of the architecture of a component that facilitates automatic fault tuning.

FIG. 2 illustrates a granular block diagram of an embodiment 200 of fault tuning component 125. The fault tuning component can comprise a monitor component 205 that probes one or more devices $140_1$-$140_N$, the resulting data, in particular device's time response is conveyed to an adjustment component 215, which determines whether adjustments to fault timings are necessary. Result of monitoring adjusting timing of devices $140_1$-$140_N$ through monitor component 205 and adjustment component 215, respectively, are stored in a data store 235. Additionally, fault tuning component 125 can be coupled to an HMI component 260, through a reporting component 225, and a computing component 280. Next, aspects of functionality of these components are described in greater detail.

A time response of a device (e.g., one of devices $140_1$-$140_N$) to an event/operation is monitored by monitor component 205. Such component can determine and request execution of event for one or more devices $140_1$-$140_N$. It should be appreciated that monitor component 205 can also monitor events effected by a disparate fault timing component. An event/operation can comprise a specific process that the device performs routinely as part of batch processing, an energize/de-energize event, or any combination thereof Additionally, in an aspect, monitoring component 205 can probe a device under simulated conditions (e.g., increased operation temperatures, increased flux of fluids circulating across a valve, higher gas pressure in a vessel) in order to analyze device response under extreme conditions and subsequent operation.

The safety characteristics of a safety device (e.g., one of devices $140_1$-$140_N$), which are inherent to each individual device within a safety system, can be monitored by monitor component 205. These extracted characteristics can be used to automatically adjust (via adjustment component 215) the overall safety integrity (within SIL or PL standards, for example) of the system as safety devices are incorporated to it. The adjusted safety integrity can then be compared to an established integrity of the safety system, and it can be verified the added safety device will not de-rate the safety system prior to allowing such added safety device to become part of said safety system (e.g., one of devices $140_1$-$140_N$).

Typically, the monitoring can consist of timing the device and its response to an operation, the extracted time can be the response time and it can be used to automatically adjust (via adjustment component 215) a fault timer associated with the device in order to (i) determine normal operation response, and (ii) avoid a fault response; the latter in the case a first fault timer had been adjusted. It should be appreciated that monitoring component can probe a device for disparate time responses depending on its operational capabilities. Monitor component 205 stores (e.g., in data store 235) device time responses, and information on probed operation, to create an operational record of the device, e.g., device intelligence, and to log the fault timers, which can be used for other components such as computing component 280 for further processing of fault timers. It is noted that the term "intelligence" herein refers to information that characterizes history or behavior of the device, including time response of a particular process. Alerts and warnings can be generated by monitor component 205 in response to a measured fault timer above a normal operation threshold, and can be communicated by reporting component 225.

An adjustment component 215 analyzes fault timer data (timed events/operations and time responses) received from monitor component 205 and adjusts/updates a fault timer. In addition, adjustment component 215 can store (in data store 235, for example) values of the adjusted fault timers in data store 235. Data on adjusted fault timers can be afforded to computing component 280 in order to compute a rolling average fault timer. Such rolling average can be a robust measure of time response in a device that executes multiple steps of a single recipe/procedure, or a highly sensitive device that displays highly fluctuating time response. The rolling average fault timer data along with the control module's configuration information can be exploited to generate additional meaningful fault data.

Operator intervention and manipulation of the data generated by and stored on fault tuning component 125 occurs via HMI component 260; in particular, a set of graphical interfaces ($262_1$-$262_M$) herein termed faceplates facilitate the intervention. Faceplates provide access to data such as fault description and time response; facilitate operator response to fault alarms/warnings; facilitate component/module (e.g., control module 120 and fault tuning component 125) configuration management, such as switching from automatic operation to manual operation; etc. Reporting component 225 conveys data and intelligence to HMI component 260.

Figure 3:
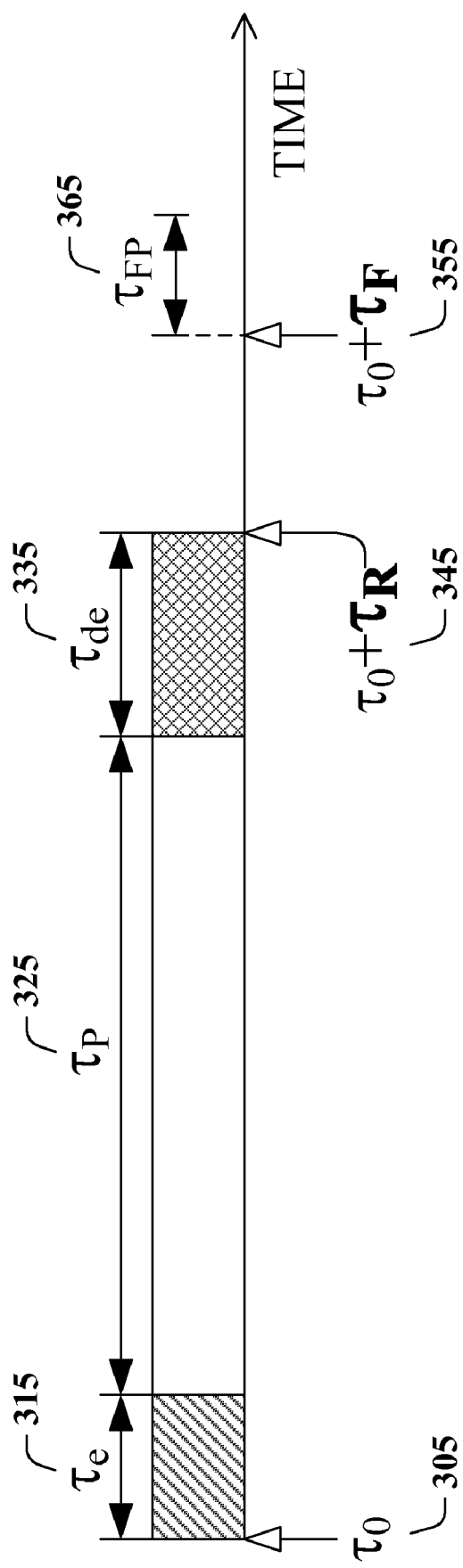
FIG. 3 is a diagram illustrating the time structure of a time response.

FIG. 3 illustrates the time structure of a time response to an operation. The event can be divided in at least three building blocks: (a) energize 315, (b) process 325, and (c) de-energize 335. Each of these stages can be associated with a step in a recipe/procedure in a batch process. Moreover, the event can be associated with a device. The time response ($\tau_R$ 345) is the time it takes to complete blocks (a)-(c). As discussed above, a fault timer ($\tau_F$ 355) is a time greater than an actual response time ($\tau_R$) 345, and an operation that fails to complete within the adjusted fault time ($\tau_F$) 355 causes the device to enter in a fault state. It should be appreciated that $\tau_F$ is preserved over several instances until a new adjustment is conducted. In the subject application, a fault timer preset ($\tau_{FP}$) 365 has been introduced. The objective of fault time preset 365 is to maintain a fault state for a period of time $\tau_{FP}$ before triggering an alarm, depending on the severity of the fault state, which is related to a device and the products it handles as part of the recipe. In an aspect, a warning can be issued when a fault state is maintained within $\tau_{FP}$. (Reporting component 225 can generate alarms/warnings.) Normal operation can correspond to delivering a response within a time $\tau_F+\tau_{FP}$.

Referring to the building blocks (a)-(c), each one has a characteristic time which can vary according to device changes such as wear of parts, electronic faults (e.g., unsuccessful error correction of a received digital data stream), operation under a poor maintenance schedule, utilization of constituents the device is not optimized to handle. Energize block 315 takes a time $\tau_e$ to complete, whereas de-energize block 335 occurs in a time $\tau_{de}$. These times can be different. An energize event can be a starting event, wherein a necessary action to complete a process (e.g., process block 325) is pursued. As an example, when a meal has to be frozen after packaging, a freezing chamber or tunnel needs to reach an operable freezing temperature, the energizing block begins at the time ($\tau_0$ 305) when a request to freeze a batch of cooked meals is placed by a controller, when the freezing temperature is reached, the request for the process has been energized, and the actual process can proceed. Similarly, when requesting to coat a batch of glass for sunglasses with a coating that filters out the ultra-violet portion of the sun radiation, a coating chamber has to reach a specific level of vacuum in order to deposit the coating successfully. When the chamber reaches the operable level of vacuum it has been energized. It is noted that the magnitude of $\tau_e$ varies depending on the targeted process, as indicated by the following list of exemplary energize times: time it takes to open a valve, to attain a specific level of vacuum in a deposition/coating chamber, to establish a magnetic field in a superconducting coil, or time to increase the temperature in an oven. A de-energize brings a device to its initial state (state at $\tau_0$) in preparation for taking part in a different process. Reaching such initial states requires a time $\tau_{de}$. It should be appreciated that fault timers can also be set for the energize/de-energize blocks. Process block 325 of the operation materializes in a time $\tau_P$. Each of these times can be monitored and recorded (e.g., stored in data store 235), such records, for example, can be used for predicting future faults as described below.

Figure 4:
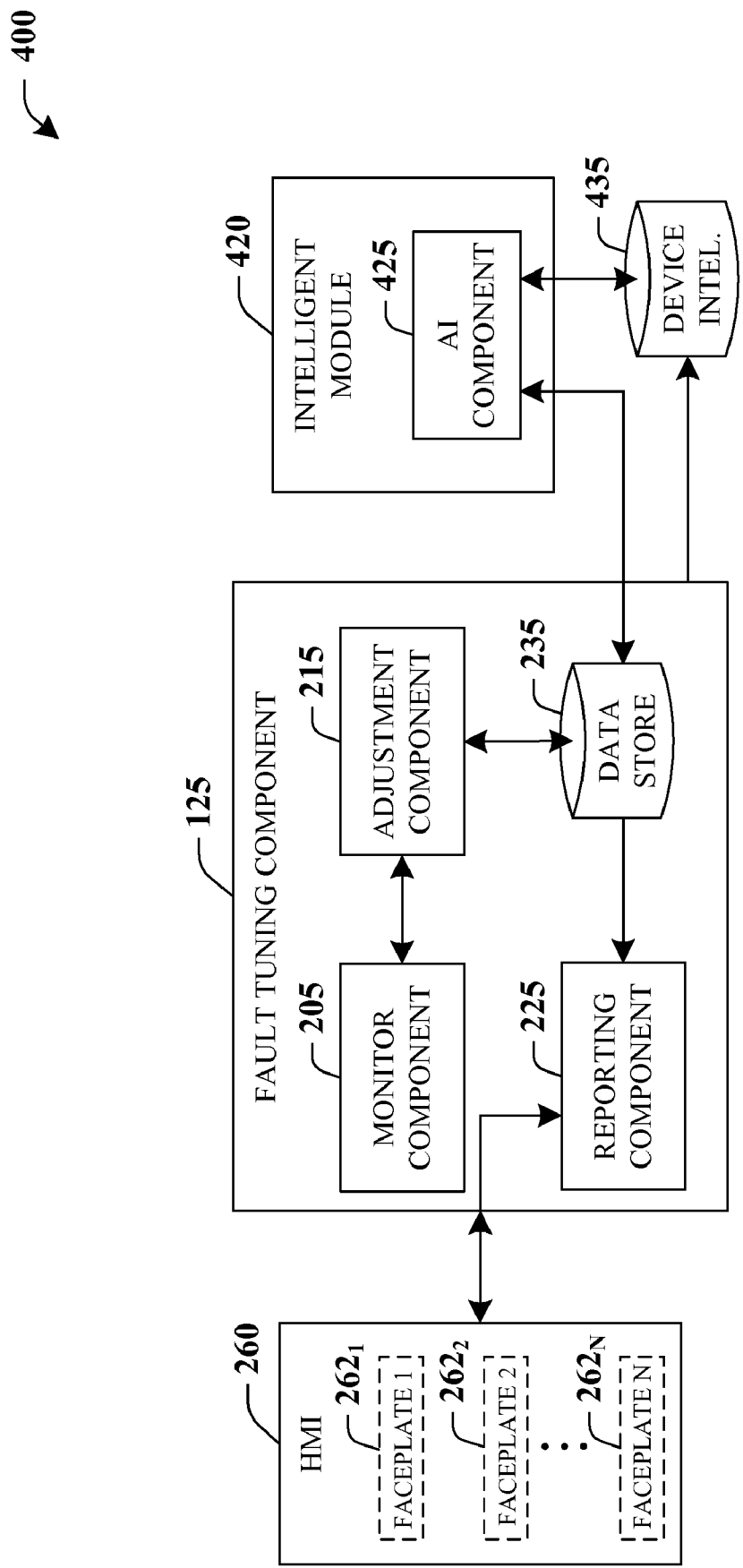
FIG. 4 is granular block diagram of a system that facilitates fault time tuning and time response characterization.

FIG. 4 illustrates a system 400 for automatic fault tuning that utilizes an intelligent module 420 and device intelligence 435 to further automate aspects of fault tuning. System 400 is based on system 200 (FIG. 2). Intelligent module can comprise an artificial intelligence (AI) component 425 that can access information stored in data store 235, and device intelligence 435. In an aspect, as illustrated in FIG. 4, device information intelligence 435 is collected by the fault tuning component 125. Device intelligence 435 can be utilized for active learning of artificial component 425. It should be appreciated that component 125 is embedded in control module 120, which can also gather device intelligence when effecting basic, procedural, and coordination control of a device (e.g., devices $140_1$-$140_N$), as stipulated in S88. It should be appreciated that fault tuning component in embodiment 400 can leverage off of more than a single intelligent module 420. Different intelligent modules can provide different inference capabilities as can be trained with different data and device intelligence. It should be further appreciated that the intelligent, automatic fault tuning afforded by system 400 can also be accomplished via the PLC of a control module (e.g., control module 120). Degrees of automation afforded by embodiment 400 are discussed next.

Intelligent module 420, through AI component 425, can identify patterns of operation of group(s) of devices, and infer the time horizon for fault tuning, e.g., the time prospects that a device will require an adjustment of its fault timer for a specific event/operation (e.g., process, energize/de-energize event). When an inferred fault timer is above an operational threshold, intelligent module 420 can issue a warning or an alarm depending on how imminent the fault is predicted to take place. Additionally, AI component 425 can utilize historical data on fault timer determination (store in data store 235, for example) to identify pattern of faults of devices. A pattern of fault is a collection of fault instance that obey a relationship. For example, a mixing tank that receives warm water and mixes the water with sugar and food coloring fluid may not attain a desired level of dilution (e.g., fault the dilution event/process) if a valve dispensing the water faults and does not fully open. It is readily apparent that these two fault events are related. Naturally, complex recipes can present complex relationships among faulty devices, which can be identified as a pattern. While the exemplary relationship we have described is related to a spatial pattern, there can be temporal patterns, wherein the time dependence of fault instances can be related in time. As an example, a conveyor belt that wears and does not roll at an optimal speed can result in sub-optimal transport of heavy lots of perishable food stacked in a weight scale, thus posing additional strain in the scale. Thus, at the time the conveyor belt fails, it can be predicted that wear and tear can be responsible for the scale fault within a determined period of time.

Complex systems can present sophisticated temporal pattern of timing fault. In addition, an intelligent module (e.g., intelligent module 420) can infer the reliability of a fault tuning setting and the operability of a fault tuning setting upon changes to a process. In an aspect, a conveyor belt can transport N lots (e.g., a box containing several units of a specific product, CDs, DVDs, books, cell phones) with a specific volume (V) and weight (w) from a packaging station to a transport dock. Such conveyor belt can have a fault time $\tau_F$. When the lots' weight changes to w+$\Delta$w, an AI component can infer a new setting ($\tau'_F$) for the fault time based, at least in part, on device intelligence (stored, in an aspect, in device intelligence store 435) such as the nature of past fault instances (e.g., number of lots in conveyor at time of fault instance), maintenance record of the conveyor belt, length of transport path, manufacturer's specifications, etc. Such manner of setting a new fault timer is termed herein as adaptive automatic fault tuning.

The term "intelligence" as used hereinbefore refers to the ability to reason or draw conclusions about, e.g., infer, the current or future state of a system or behavior of a user based on existing information about the system or user. Artificial intelligence can be employed to identify a specific context or action, or generate a probability distribution of specific states of a system without human intervention. Artificial intelligence relies on applying advanced mathematical algorithms—e.g., decision trees, neural networks, regression analysis, cluster analysis, genetic algorithm, and reinforced learning—to a set of available data (information) on the system.

It should be appreciated that artificial intelligence component 425 in intelligent module 420 can employ one of numerous methodologies for learning from data and then drawing inferences from the models so constructed, e.g., Hidden Markov Models (HMMs) and related prototypical dependency models, more general probabilistic graphical models, such as Bayesian networks, e.g., created by structure search using a Bayesian model score or approximation, linear classifiers, such as support vector machines (SVMs), non-linear classifiers, such as methods referred to as "neural network" methodologies, fuzzy logic methodologies, and other approaches that perform data fusion, etc.) in accordance with implementing various automated aspects described herein. These methodologies can be stored in AI component 425 or in an algorithm store (not shown) in an intelligent module (e.g., intelligent module 420).

Figure 5:
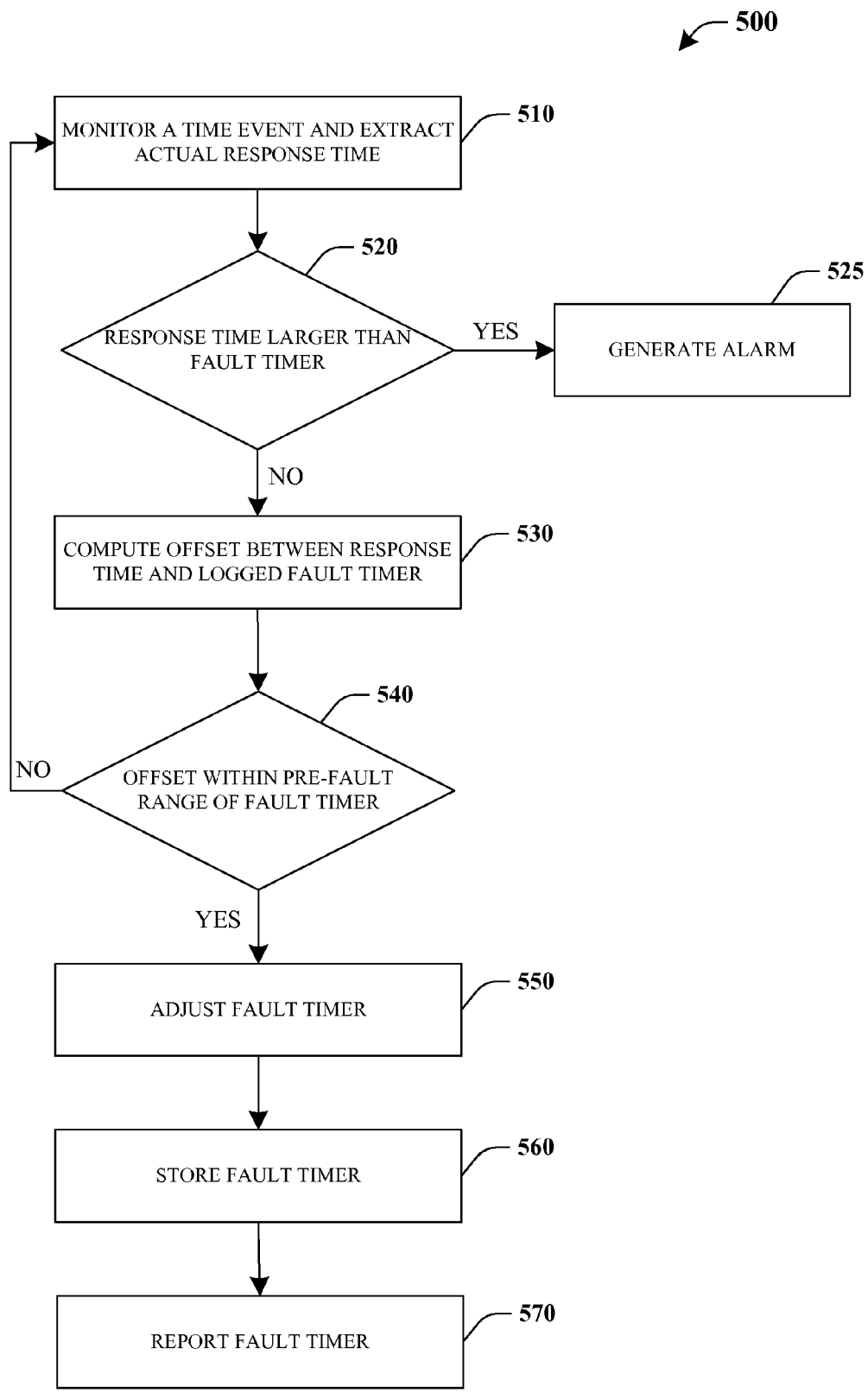
FIG. 5 is a flowchart of a method for automatic fault tuning.
Figure 6:
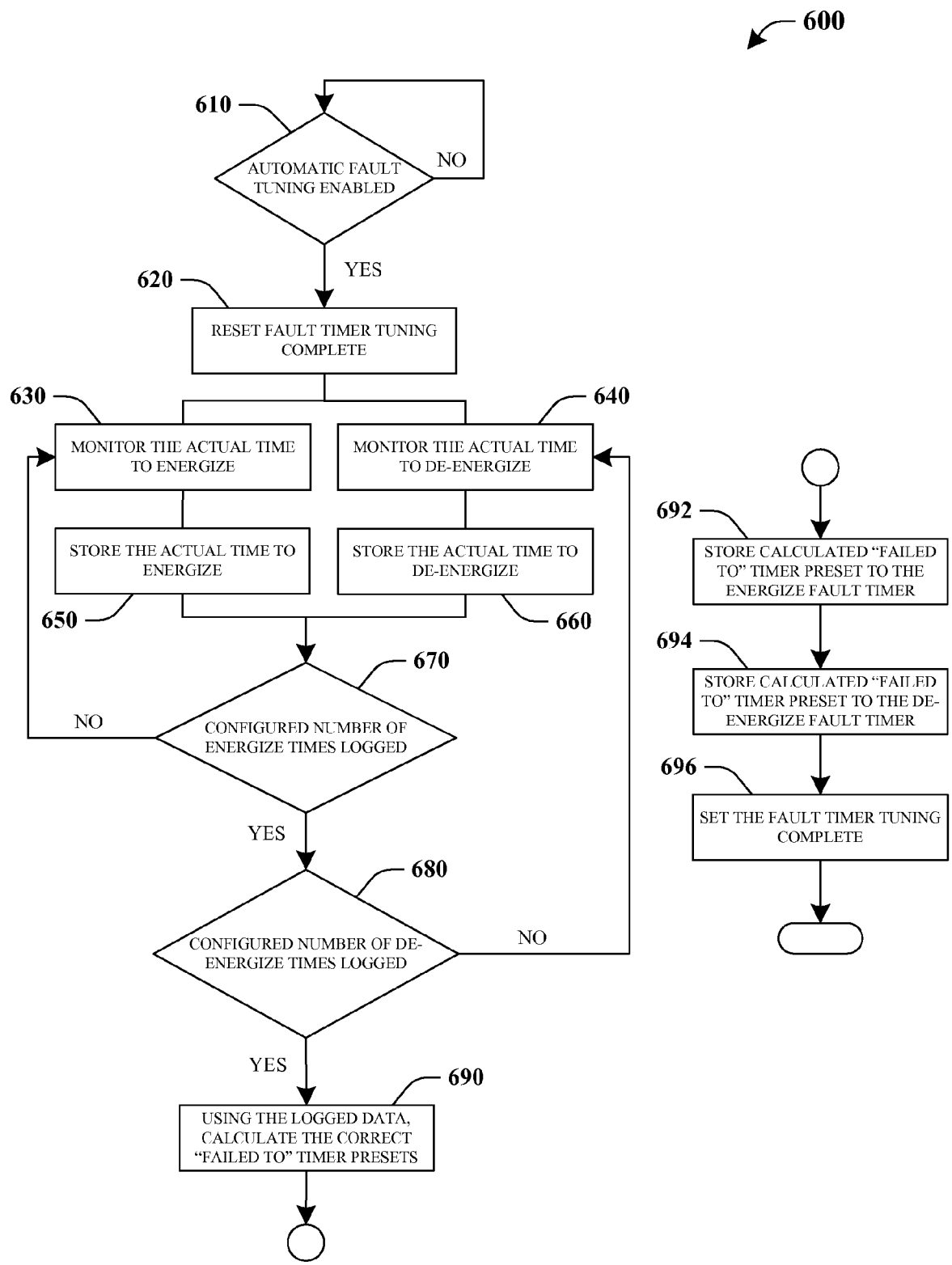
FIG. 6 is a flow chart to determine energize and de-energize time presets.
Figure 7:
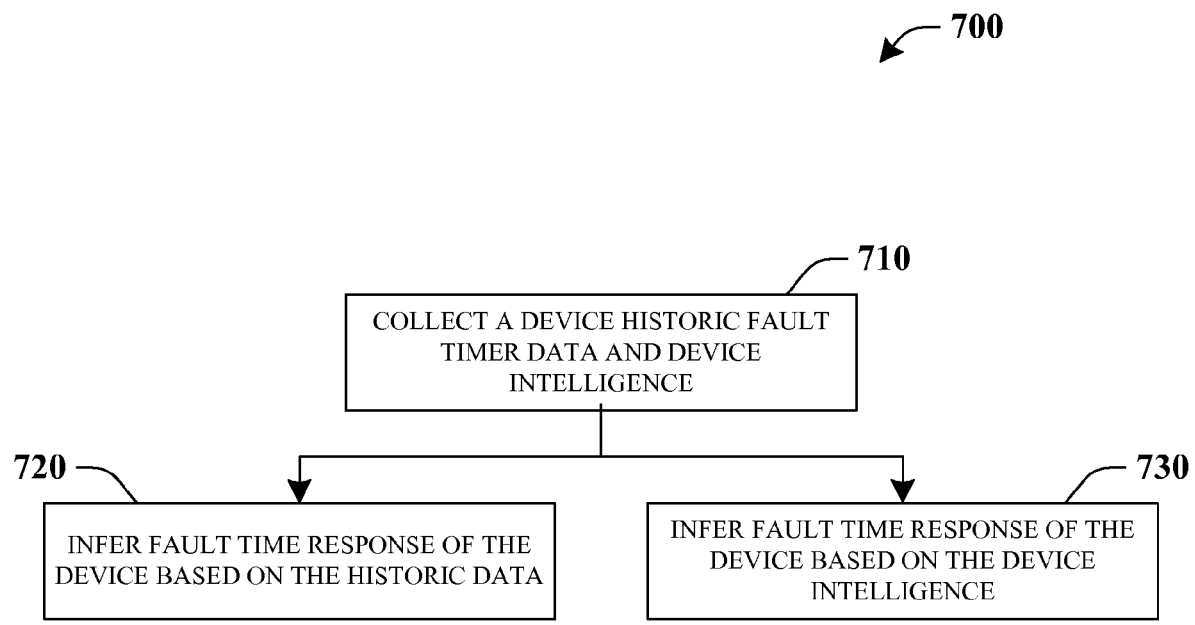
FIG. 7 is a flowchart of a method to assess time response.

FIGS. 5-7 illustrate various methodologies in accordance with the claimed subject matter. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or operations, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers.

FIG. 5 presents a method for automatic fault tuning. At 510, a time event is monitored and an actual response time is extracted. In an aspect, such monitoring is performed on a device that is part of batch process operation, at a time the device is not executing a portion of a recipe in which it is involved, yet the device is active and operational instead of placed on a maintenance cycle. Monitoring a device while operational can reduce costs associated with shutting the device for maintenance. It is noted that for a single device, multiple events can be monitored depending on its complexity, e.g., a mixing tank that can operate at various temperatures, and mix multiple substances at multiple rates can have a number of events monitored. Act 520 checks whether the extracted response time is larger than the fault timer. In the affirmative case, an alarm is generated at act 525. At 530, an offset is computed between the extracted response time and a logged fault timer for the event monitored. The offset can be defined as the difference between the logged fault timer and the extracted response time. A validation act is performed at 540: the computed offset is compared to a pre-fault time interval, which defines a pre-fault range. The pre-fault range is a time interval defined around the fault timer and constitutes a preemptive instrument that indicates a fault timer should be adjusted before a fault condition develops. If the offset is within the pre-fault interval, the fault timer is adjusted at 550, and stored 560, and reported at 570. In case the offset is outside the pre-fault interval, a monitoring cycle is conducted; the logic flow is transferred to 510.

FIG. 6 presents a method to determine energize and de-energize fault timer presets. Act 610 is a validation, loopback cycle that determines whether automatic fault tuning is active. In case automatic fault tuning is active, act 620 resets a fault timer tuning complete logic flag. Acts 630 and 640 monitor, respectively, actual time to energize and de-energize. In an aspect, such times can be disparate (see FIG. 3), depending on energize/de-energize protocol, e.g., heat dissipation in a de-energize step of a heated element can be limited by the heat capacity and surface of a radiator, whereas heating such element can depend on heat capacity of a fluid, gas mixture, or solid; the heat capacities involved in energize/de-energize steps clearly disparate. Act 650 stores the actual energize time and act 660 stores the de-energize time. Validation acts 670 and 680, seek confirmation, respectively, that a predetermined number of energize times and de-energize times have been configured. At 690, "fail to" timer presets are computed from logged data. Fault timer presets are time intervals that offset a fault timer. Within a fault timer preset fault conditions are maintained without issuing a fault indication (e.g., warning, alarm). At 692 and 694, the timer presets are stored. Act 696 sets the fault timer tuning complete logic flag.

FIG. 7 presents a method 700 to assess time response of a device and further automate fault tuning. At 710, a device historic data on fault timer and device intelligence is collected. In an aspect, such information can be collected by a fault tuning component embedded in a control module (e.g., component 125) during automatic fault tuning of a device. In another aspect, device intelligence can be collected by a disparate control module, can be uploaded by a design engineer during deployment of a device, or by a maintenance operator during repair and routine maintenance of the device, or any combination thereof. At act 720, fault time response (e.g., timer settings) is inferred based on historic data of fault time response of the device, and at 730 it is inferred based on accumulated device intelligence.

FIGS. 8-12 illustrate several aspects of modules, including control modules that are relevant to batch control within the S88 standard, and relevant to implementing various automated aspects described herein.

Figure 8:
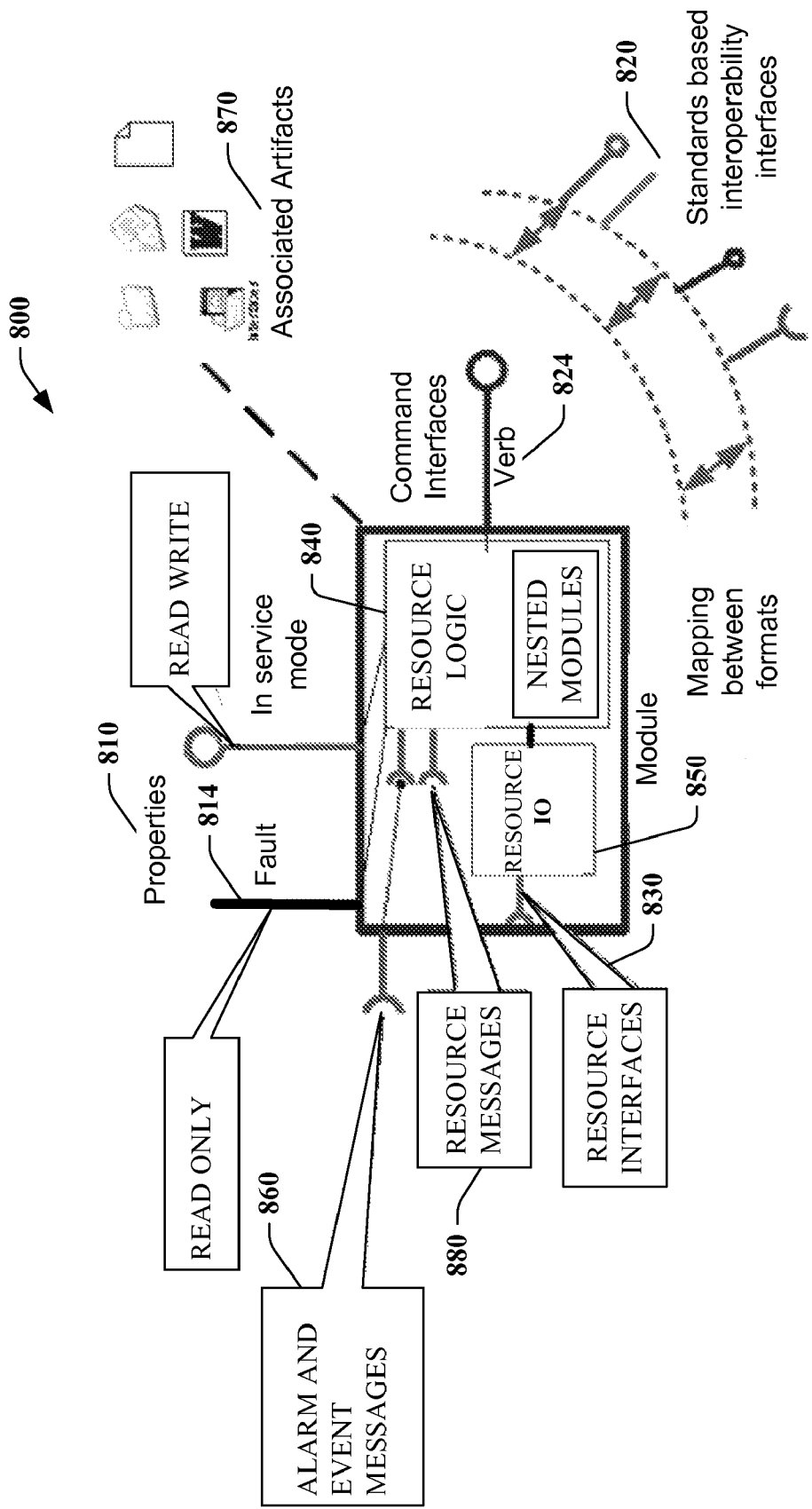
FIG. 8 is a diagram illustrating module attributes.

Referring now to FIG. 8, module attributes 800 are illustrated. The attributes 800 depicted in FIG. 8 include a common (or exemplary) representation that can be modules from modules. Generally, a set of standard attributes can be determined that are common to all modules. Similarly, for other types of modules described below, additional standard attributes can be defined. An example of a property 810 available on modules includes attributes such as Fault and Status at 814. Active resource modules (e.g., equipment and personnel) can support additional properties 810 such as available/unavailable.

Attributes presented below are represented associations from the module to objects which may be internal in a common data model or elsewhere (e.g., CAD Files). At 820, standard public interfaces can be provided. These interfaces 820 publish verbs 824 that are available to external systems and are documented activities that hide the complexity of the underlying code used to implement the interface. Interfaces 820 can be considered into at least two common usage scenarios. For example, interfaces 820 can be used as access points that can be used to hook in real time diagnostics, security and so forth.

Public verbs 824 initiate an action within the module. The activity is described to clients of the interface 820. The implementation is considered private and is not presented to clients—for example, Open, Stop, Abort, Shut, and so forth. A data value property 810 provides public access to information that is used by the module during its operation and can be provided by request values and/or internal values (or an equivalent). The association of logic to transfer request values to internal values and vice versa are referred to as get and set logic for the value. It is noted that in a controller, if there is not a set routine to transfer request values to internal values, the internal value can overwrite the request value on the next scan providing read only capability.

In general, the properties 810 can be considered in at least two classifications. States have special significance for production systems and can have a specific set of values that can be represented by range or enumeration. A state can represent the current status of the primary resource being encapsulated by the module e.g., Percent open, Mode, Service (in, out), and so forth. Information that is used by the module during its operation includes access to data that is provided by interfaces 820. e.g., Conversion Map, Name, Description, expiry date, personnel contact information.

Some properties 810 can be common to all instances of resource modules (e.g., scanned copy of resource specification documents), whereas other properties 810 are specific to each module instance (e.g., status, percent open).

At 830, internal resource interfaces include interfaces from logic 840 in the module to the resource being managed at 850, where the logic includes code and/or configuration that processes a command and/or updates state and data properties. In some cases, this can be hardware such as I/O interfaces, or in other cases it is to subordinate resource control modules that have direct interfaces. Some examples include I/O mapping, material management logic routines, and so forth. These interfaces 830 are internal to the module enabling the modules public interfaces 820 and properties 810 to be the boundary to other system components. Modules that wrap different resources but support the same public properties/interfaces can be exchanged without disrupting interfaces to other components. Generally, I/O mapping and system messaging interfaces are exposed during deployment bind processes. When bound, external interfaces 820 to runtime systems may then consider these interfaces as internal.

At 860, alarm and event messages can be provided which include messages that exposed as runtime messages visible to external systems during the execution of the module. This includes alarms and events explicitly coded by the developer and system messages promoted to be visible by external systems. At 870, one or more artifacts include information that document the operation and structure of the resource such as for example, wiring diagrams, warranties, payroll, parts supplier information, and so forth. Visualization aspects include associated graphics that present the resource state and properties to applications interacting with the resource. For example: faceplates, icons, state overlays, edit dialogs, help files. At 880, system messages allow modules to listen for and publish data model messages to external components. Inbound messages are typically used to manage modules (configure, initialize, propagate properties, and so forth) and publish messages on module activity (resource state, data model messages, and so forth).

Figure 9:
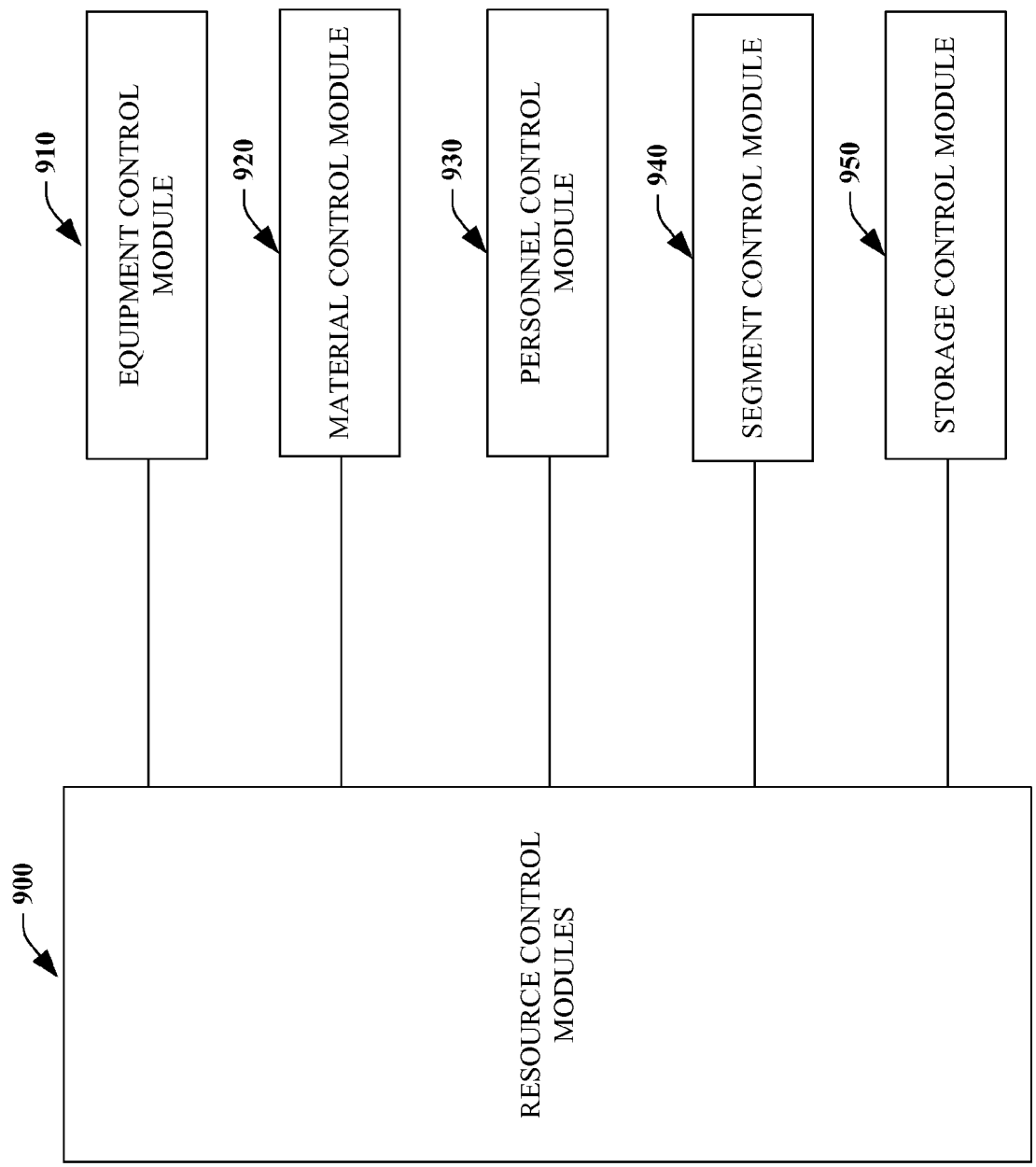
FIG. 9 is a diagram illustrating example resource control modules.

Turning to FIG. 9, example resource control modules 900 are illustrated.

In general, resource control modules 900 provide simple control of one or more resources. The resource control module (RCM) 900 represents the logic to manage the state or data of the resource and may contain other resource control modules to achieve its respective functionality. The RCM 900 provides public interfaces via actions and properties. In some cases, an action may be a simple bit value or a request value that is interfaced to internal values in the module and in other cases more complex logic can be provided. The RCM 900 can include other resource control modules and may promote a command to be represented as segment resource control interface. Example forms of the RCM 900 include:

At 910, an Equipment Control Module (Common name="Control Module") CM. The simplest form of basic regulatory control of equipment. Encapsulating the equipment and its control such as control of values, drives, and so forth. At 920, a Material Control Module (MCM) can be provided. Management of Material resource instances which are represented as sub-lots including change in location, quality status, availability, order status, logic that can be performed on material sub-lots, generation of material events such as consumed, produced and moved events, sub-lot combination, expiry dates, and so forth.

At 930, a Personnel Control Module (PCM) is provided. This includes management of individual people such as Active, Idle, Break states directly or via shift schedules. This also includes data associated with people such as shift time patterns, for example. Other attributes that may be managed by PCM 930 are a person's location in a plant (GPS), qualification checks, or current assignment, for example. At 940, a Segment Control Module (SCM) includes manipulation of simple segment tasks such as piping paths, AGV paths, device state machines, robotic sequences and so forth. The SCM 940 typically performs an action on one segment such as next step to execute after the current step. At 950, a Storage Control Module (STGCM) includes Manipulation of simple storage logic such as buffer capacity and ordering into and out of a queue for the respective storage unit or requirement.

Figure 10:
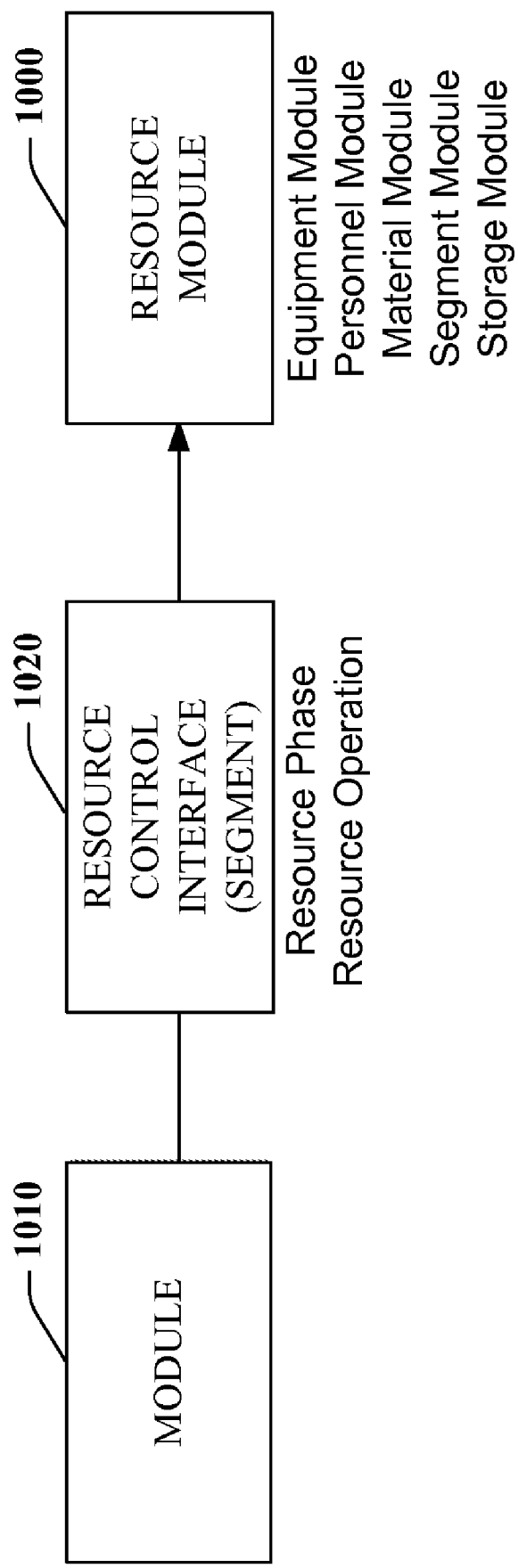
FIG. 10 is a diagram illustrating a resource module.

FIG. 10 illustrates a resource module 1000 for an industrial control system. Resource modules 1000 extend resource control modules described above to enable coordination of resources (equipment, people, modules and so forth) to achieve. As shown, the resource control module 1000 includes a module 1010 and a resource control interface 1020. Resource modules 1000 are also able to represent more complex activities than resource control modules. For example, resource modules may include other resource control modules at 1010 and/or other resource modules. For example, an equipment module may leverage a subordinate material control module to represent material handling aspects or a segment module to solicit an electronic signature.

Before proceeding it is noted that other types of modules are possible than shown. For instance, a configuration module may include management definitions and configuration of resources—personnel, segments, equipment, segments, storage, and so forth. Another type of module includes nested modules where a module references other modules. These modules may be children of a parent module or shared from one module to another. Resource modules may include resource control modules however resource control modules should not include resource modules. Modules can include modules focused on other resource types, for example an equipment module may include equipment modules and material modules.

Figure 11:
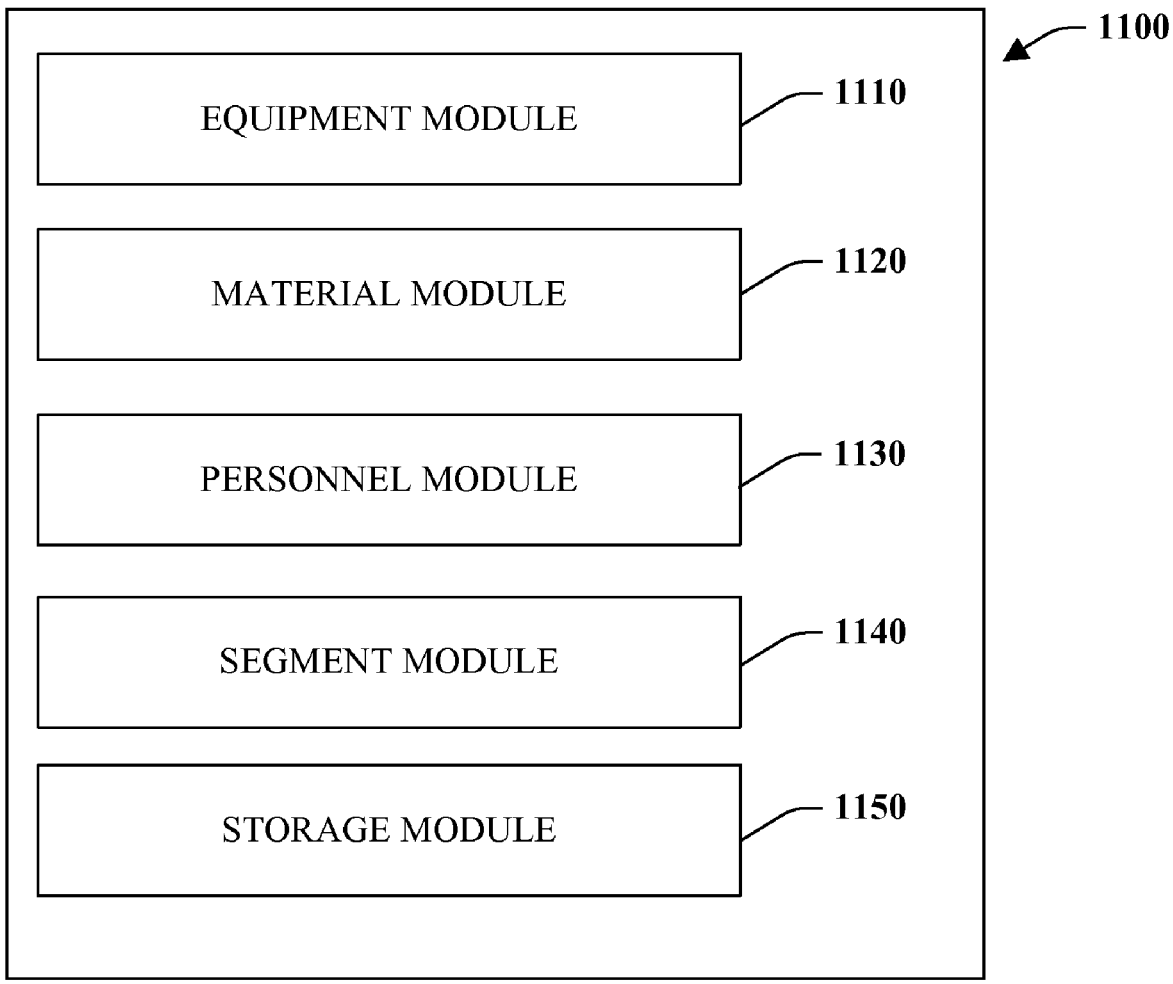
FIG. 11 is a diagram illustrating example resource modules.

FIG. 11 illustrates example resource modules 1100 for an industrial control system. At 1110, an Equipment Module provides coordination of equipment modules and equipment control modules to perform a process-orientated task independent of specific material e.g., In-feed, AGV controller, Conveyor, and so forth. At 1120, a Material Module provides coordination of material modules and material control modules to perform material focused tasks e.g., Material reservation, provision, material mass balance calculation, Bill of Material management, Work order management, and so forth.

At 1130, a Personnel Module provides coordination of personnel modules and personnel control modules to perform personnel focused tasks e.g., Electronic signature collection, Security validation, certification validation, Manual control interactions, and so forth.

At 1140, a Segment Module provides coordination of segment modules and segment control modules and to execute sequences of tasks represented by segments. Segments define resource requirements and ordering that can represent most production and process activities. This module provides access to more complex tasks that require specific sequences to be followed e.g., Process Analytics Technology (PAT) integration, electronic signatures collection, defect, process deviation and fault recovery processing.

The segment module 1140 may also construct a sequence to be followed that can be applied as manual, automatic or semi automatic sequences (e.g., Route, recipe execution)

At 1150, a Storage Module provides coordination of storage related activities, allocation of storage to requesters, modeling of inventory calculations and so forth. This also includes interaction with higher-level systems that manage storage and inventory information.

Figure 12:
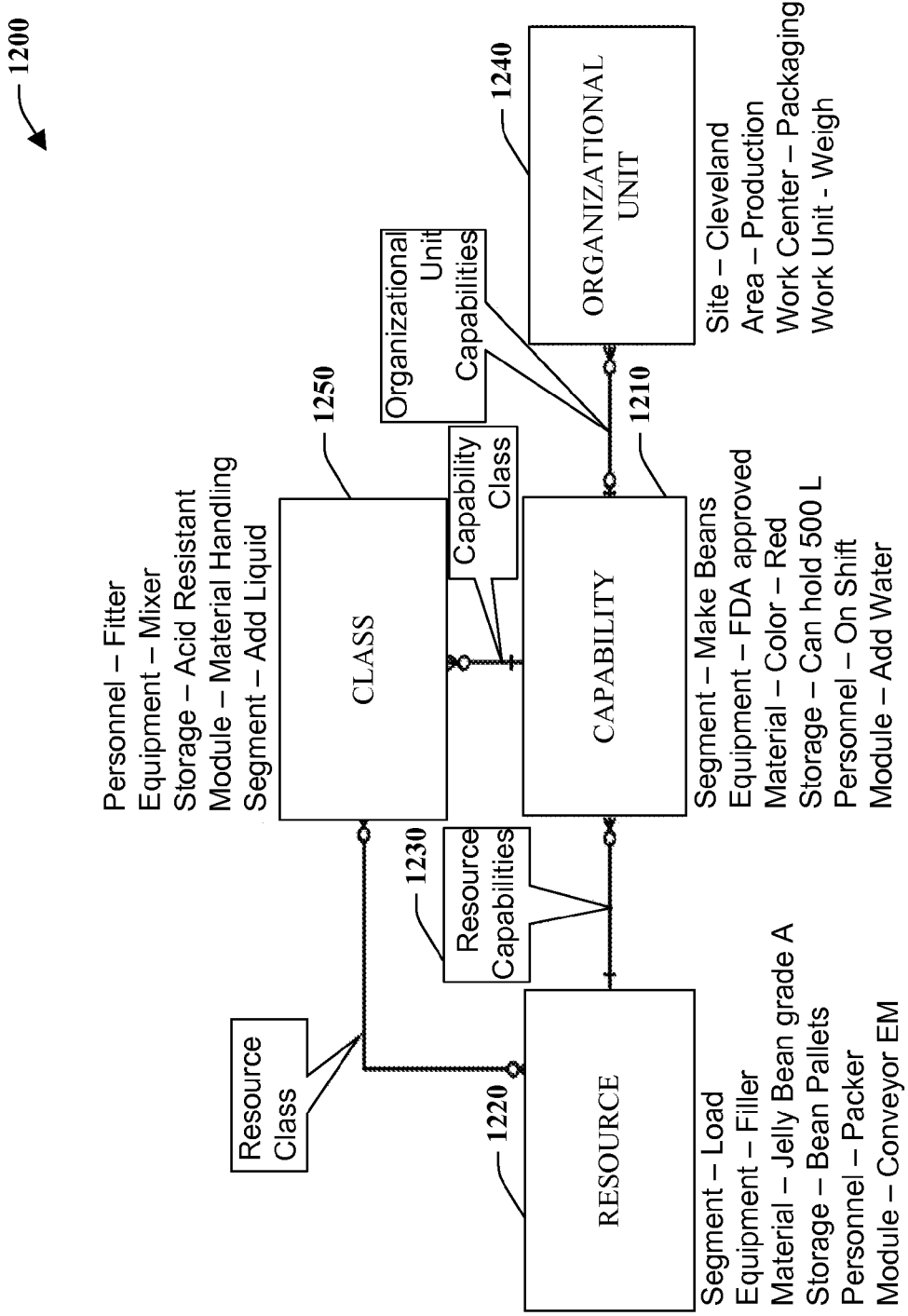
FIG. 12 is a diagram illustrating a resource control model.

FIG. 12 illustrates an example resource control model 1200 for an industrial control system. Resource Control Interfaces are the interfaces exposed to production management systems for resource binding and arbitration purposes. The interfaces are elements of the resource control model 1200 including procedures, operations or phases. These interfaces are made available by exposure via one or more capabilities 1210 described below. Procedures, operations and phases depicted in this model 1200 are commonly referred to in association with their module resource type such as Equipment Phase, Personnel Phase, Segment Phase, or as a generic Resource Phase where no specific resource module is required. Production management including Product Production Rules (production route or control recipe) physically bind to (reference) resource control phases to perform work. The availability of other resources 1220 such as material, equipment, personnel are considered during the binding process of product production rules to work centers (production lines, process cells, and so forth). These selection processes evaluate resource capabilities to locate the appropriate resource for the task.

Resource capabilities 1210 include the resource 1220 required to perform work in a production system. Consequently, resources 1220 are at the centre of, efficiency, capacity, scheduling and arbitration considerations. A resource's ability to work or be available to allow work to commence is represented as resource capability at 1230. The existence of capability 1230 associated with a resource 1220 does not make the resource available for production; the resource's capability 1230 is associated with organizational units 1240 that are will support the respective resource capability. For example, an operator (personnel resource) may have qualifications for a Mixer in line 1, where this qualification capability is only in effect with that specific mixer unless explicitly directed. Resource arbitration algorithms can search for resource capabilities 1230 in the scope of organizational units 1240 they are to be executed within.

Resources 1220 publish capabilities to organizational units 1240 for use by system processes in a given scope. Modules are a type of resource and can be accessed directly by published capabilities 1210. However, a more common interface to Resource Modules is via verbs that are supported by the Resource Module noted above. These verbs are Resource Control elements (phases, operations, procedures . . . ) which are segments. A published capability of a resource module is typically one of the phases supported the module. Resource control interfaces are published (made available) to the outside world as capabilities 1210. Resource modules provide the ability to promote a command to become a resource control interface.

Some process control systems are built using only Resource control modules (especially control modules). Examples of this are continuous processes such as petrochemical and heavy chemical plants. In order to initiate, the process takes a plant up to its running state or makes a change to the state of a series of commands that are initiated and coordinated to achieve the new state. It is also possible to promote commands from resource control modules to appear as capabilities that can be accessed as "tuning knobs" for tweaking the system between system states. As shown in the model 1200, the resource 1220 and capability can be associated with a higher-level class or abstraction 1250.

Embodiments, systems and components described herein, as well as industrial control systems and industrial automation environments in which various aspects set forth in the subject specification can be carried out, can include computer or network components such as servers, clients, programmable logic controllers (PLCs), communications modules, mobile computers, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC as used herein can include functionality that can be shared across multiple components, systems, and/or networks. As an example, one or more PLCs can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC can also communicate to and control various other devices such as I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including DeviceNet and ControlNet. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Moreover, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. A method that facilitates fault tuning for a device operating in an industrial process, comprising:
employing at least one processor executing computer-executable instructions stored on a computer-readable storage medium to implement the following acts:
monitoring a timed event of the device during execution of the industrial process to determine a response time for the timed event; and
automatically adjusting a fault timer associated with the timed event according to the response time.

2. The method of claim 1, wherein the automatically adjusting the fault timer comprises:
defining a pre-fault time range;
computing a difference between the response time and a time defined by the fault timer; and
automatically adjusting the fault timer if the difference is within the pre-fault range of the time defined by the fault timer.

3. The method of claim 1, the timed event includes a process event, an energize event, and a de-energize event.

4. The method of claim 1, further comprising storing the response time.

5. The method of claim 1, further comprising:
measuring and storing at least one time to de-energize the timed event and at least one time to energize the timed event;
computing a preset for a de-energize fault timer based on the at least one time to de-energize; and
computing a preset for an energize fault timer based on the at least one time to energize.

6. The method of claim 1, further comprising generating at least one of a report or a parameter to communicate a fault response if the response time exceeds a time defined by the fault timer.

7. The method of claim 1, further comprising generating an alarm if the fault timer exceeds a threshold value assigned to the device.

8. The method of claim 1, further comprising inferring fault time response of the device based on historical fault timer data for the device.

9. The method of claim 1, further comprising employing the at least one processor to infer a new setting for the fault timer upon modification of the industrial process, the new setting based at least on the modification and historical fault data for the industrial process.

10. The method of claim 1, wherein the automatically adjusting the fault timer comprises:
calculating a rolling average of response times for the timed event; and
adjusting the fault timer based on the rolling average.

11. A system that facilitates fault tuning for a device used in an industrial process, comprising:
a processor;
a memory communicatively coupled to the processor, the memory having stored therein computer-executable instructions configured to implement the system, including:
a component configured to monitor the device and to measure a response time for an event performed by the device during execution of the industrial process; and
an adjustment component configured to automatically adjust a fault timer for the event based on the response time.

12. The system of claim 11, further comprising a reporting component configured to store the response time.

13. The system of claim 12, the reporting component configured to generate a report to communicate fault time response.

14. The system of claim 12, the reporting component further configured to generate an alarm if the fault timer exceeds a value assigned to a normal response of the device.

15. The system of claim 11, the event is a process carried out by the device.

16. The system of claim 11, further comprising an intelligent module configured to infer a setting for the fault timer based on historical response time data for the device.

17. The system of claim 16, the intelligent module further configured to issue at least one of a warning or an alert if the setting for the fault timer is above a threshold value.

18. The system of claim 16, wherein the device operates within the industrial process, and the intelligent module infers a new setting for the fault timer upon modification of the industrial process, the new setting based at least on the modification and historical performance data for the device.

19. The system of claim 16, the intelligent module further configured to infer a safety rating of the industrial process in response to the device being connected to a safety system.

20. The system of claim 11, further comprising a human-machine interface that facilitates selecting the device being monitored or responding to an alarm.

21. A machine that facilitates fault tuning of an industrial device operating in an industrial process, comprising:
a processor;
a memory communicatively coupled to the processor, the memory having stored therein computer-executable instructions configured to implement the fault tuning, including:
means for measuring an operation response time for the device during execution of the industrial process; and
means for automatically adjusting a fault timer for the device according to the response time.

22. The machine of claim 21, further comprising means for reporting the response time, and means for generating an alarm if the response time exceeds the fault timer.

23. The machine of claim 21, further comprising means for averaging operation response times for a plurality of process events performed by the device.

24. The machine of claim 23, further comprising means for adjusting the fault timer based on results generated by the means for averaging.

25. A computer-readable medium having stored thereon instructions that when executed by a processor carry out the following acts:
configuring a fault tuning device to monitor a response time for an operation performed by an industrial component during execution of an industrial process and to store the response time; and
adjusting, in accordance with the response time, a fault timer associated with monitoring logic used by the fault tuning device to monitor the industrial.

* * * * *